United States Patent [19]

Mills, Jr.

[11] 4,268,749

[45] May 19, 1981

[54] METHOD FOR DIRECTLY MONITORING THE OUTPUT OF A NEUTRON SOURCE IN A BOREHOLE LOGGING SYSTEM

[75] Inventor: William R. Mills, Jr., Duncanville, Tex.

[73] Assignee: Mobil Oil Corporation, New York, N.Y.

[21] Appl. No.: 951,696

[22] Filed: Oct. 16, 1978

[51] Int. Cl.³ .......................... G01V 5/00; G01T 3/00
[52] U.S. Cl. .................................. 250/269; 250/390
[58] Field of Search .............. 250/262, 265, 269, 270, 250/390, 391, 392

[56] References Cited

U.S. PATENT DOCUMENTS

| | | | |
|---|---|---|---|
| 2,979,618 | 4/1961 | Rickard | 250/269 |
| 3,509,346 | 4/1970 | Mills, Jr. et al. | 250/262 |
| 3,688,117 | 8/1972 | Givens | 250/269 |
| 4,074,136 | 2/1978 | Heinzelmann | 250/390 |

Primary Examiner—Alfred E. Smith
Assistant Examiner—Janice A. Howell
Attorney, Agent, or Firm—C. A. Huggett; M. G. Gilman; G. W. Hager

[57] ABSTRACT

A borehole logging tool includes a source of fast neutrons and a fast neutron detector. A discriminator connected to the detector rejects pulses from the detector attributable to nonsource neutrons from the formation and passes to a count rate meter those pulses from the detector attributable to source neutrons. The output of the count rate meter is recorded as a measure of neutron source output.

11 Claims, 3 Drawing Figures

METHOD FOR DIRECTLY MONITORING THE OUTPUT OF A NEUTRON SOURCE IN A BOREHOLE LOGGING SYSTEM

BACKGROUND OF THE INVENTION

This invention relates to radioactive well logging and more particularly to pulsed neutron logging.

Perhaps the most widely used of the radioactive logging procedures are the neutron logging techniques in which a formation under investigation is irradiated with neutrons and the resulting secondary radiation measured in order to characterize the formation. The neutron irradiation may be by means of a continuous source or a pulsed source, and the secondary radiation detected typically will take the form of thermal or epithermal neutrons or gamma rays such as may result from inelastic scattering reactions or neutron capture. In pulsed neutron logging, the formation is bombarded with repetitive time-spaced bursts of fast neutrons, and the resulting secondary radiation is measured at selected time intervals, normally by gating the output of the detector, in order to arrive at a decay parameter.

A pulsed neutron generator for such a system commonly takes the form of a three-element, linear accelerator tube. It includes a replenisher element which is electrically heated to boil off deuterium gas absorbed by the filament. The deuterium molecules are ionized by an ionizing section which commonly includes plates to which a positive ionization pulse is applied. The deuterium ions are then accelerated and bombard a target which includes tritium molecules. The bombardment of the deuterium ions on the tritium molecules yields helium plus a supply of neutrons. One commercially available tube which is capable of such operation is the Kaman Nuclear Model A-801 Neutron Generator.

Such accelerator type neutron sources have a high-energy, high-intensity monoenergetic neutron output which varies widely and unpredictably in intensity. Hence, it is desirable to monitor the output to know that a constant output is produced during each measuring period or to correct or compensate for variations in the neutron output. The response time of a conventional fast neutron detector is not fast enough to detect directly and measure accurately the number of neutrons produced by the source when it is being operated to produce neutron bursts having a time duration of a few microseconds or less.

SUMMARY OF THE INVENTION

In accordance with the present invention there is provided a system for directly monitoring the output of a fast neutron source in a borehole logging tool.

A neutron detector interacts differently with neutrons received directly from the fast neutron source and with epithermal or thermal neutrons returning to the borehole from irradiated formations surrounding the borehole. The detector produces a composite signal of pulses having a spectrum of differing pulse height characteristics attributable to such differing interactions.

The neutron detector preferably comprises helium-3 gas under pressure so as to provide sensitivity to fast neutrons. A first portion of the composite signal from the detector is attributable to the detection of epithermal or thermal neutrons from the formation in accordance with the $^3He(n,p)^3H$ reaction. Such first portion exhibits pulse heights rising to a peak with center at about 0.7 MEV and decreasing substantially to zero thereafter. A second portion of the composite signal from the detector is attributable to the detection of fast neutrons directly from the neutron source in accordance with the $^3He(n,n)^3He$ reaction. Such second portion exhibits pulse heights ranging up to a maximum of about 11.5 MEV for source neutrons with energy of 14 MEV.

A discriminator distinguishes between such differing pulse height characteristics by passing only those pulses representing that part of the second portion of the spectrum of the composite signal exceeding the trailing edge of the pulse height peak centered at about 0.7 MEV and attributable to epithermal and thermal neutrons from the formation. The number of pulses passed by the discriminator is counted as a measure of the magnitude of source output.

DESCRIPTION OF THE PREFERRED EMBODIMENT

Figure 1:
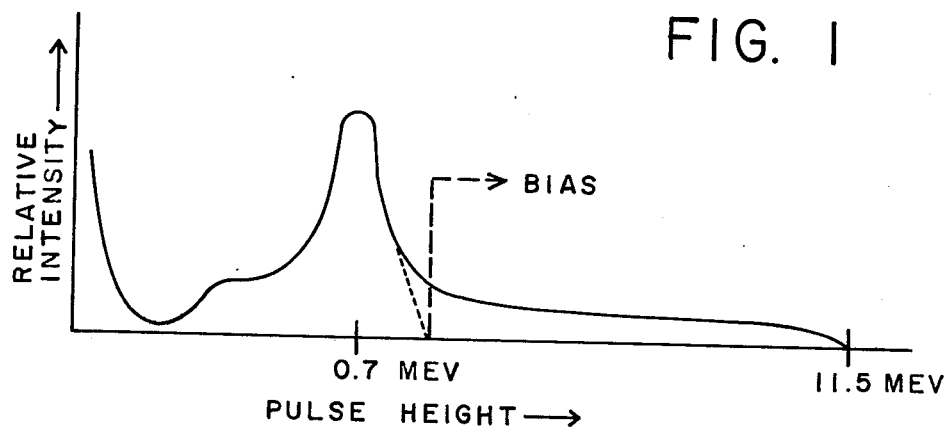
FIG. 1 illustrates the pulse height spectrum obtained from the epithermal neutron detector of FIG. 2.

In accordance with the present invention there is provided a technique for monitoring the output of a neutron source as might be used, for example, in a borehole logging system of the type shown in U.S. Pat. No. 3,509,346 to Mills et al. Such method is based upon the use of a fast neutron detector that views the neutron source directly and for which interactions occur between source neutrons and the detector-sensing material that are different from the interactions occurring between nonsource neutrons and the detector-sensing material. An example of such interactions is the elastic recoil of helium-3 nuclei in a helium-3 gas detector. When 14-MEV neutrons, which are produced by the deuterium-tritium reaction in a neutron source, collide with helium-3 nuclei, the latter are given sufficient energy in a percentage of the collisions to be distinguished from other neutron and helium-3 interactions. For example, FIG. 1 shows the pulse height spectrum which would be obtained from a helium-3 neutron detector if the neutron source were producing neutrons continuously rather than by being pulsed. The left-hand part of the spectrum is due primarily to the detection of epithermal or thermal neutrons from the formation and secondarily to the detection of fast neutrons directly from the neutron source. The epithermal and thermal neutrons react with helium-3 gas within the detector in accordance with the $^3He(n,p)^3H$ reaction. Since these nonsource neutrons carry very little kinetic energy, the energy released in the gas within the detector through this reaction is essentially that of the "Q" of the above reaction with a peak occurring at about 0.7 MEV. This reaction tails off quite rapidly subsequent to its 0.7-MEV peak as illustrated by the dashed line in FIG. 1. The right-hand part of the spectrum above the trailing edge of the spectrum peak at about 0.7 MEV is due to helium-3 recoils from the reaction $^3He(n,n)^3He$ when source neutrons arrive directly at the detector. Source neutrons of 14-MEV energy will give a maximum of 11.5 MEV to a helium-3 recoil.

Figure 2:
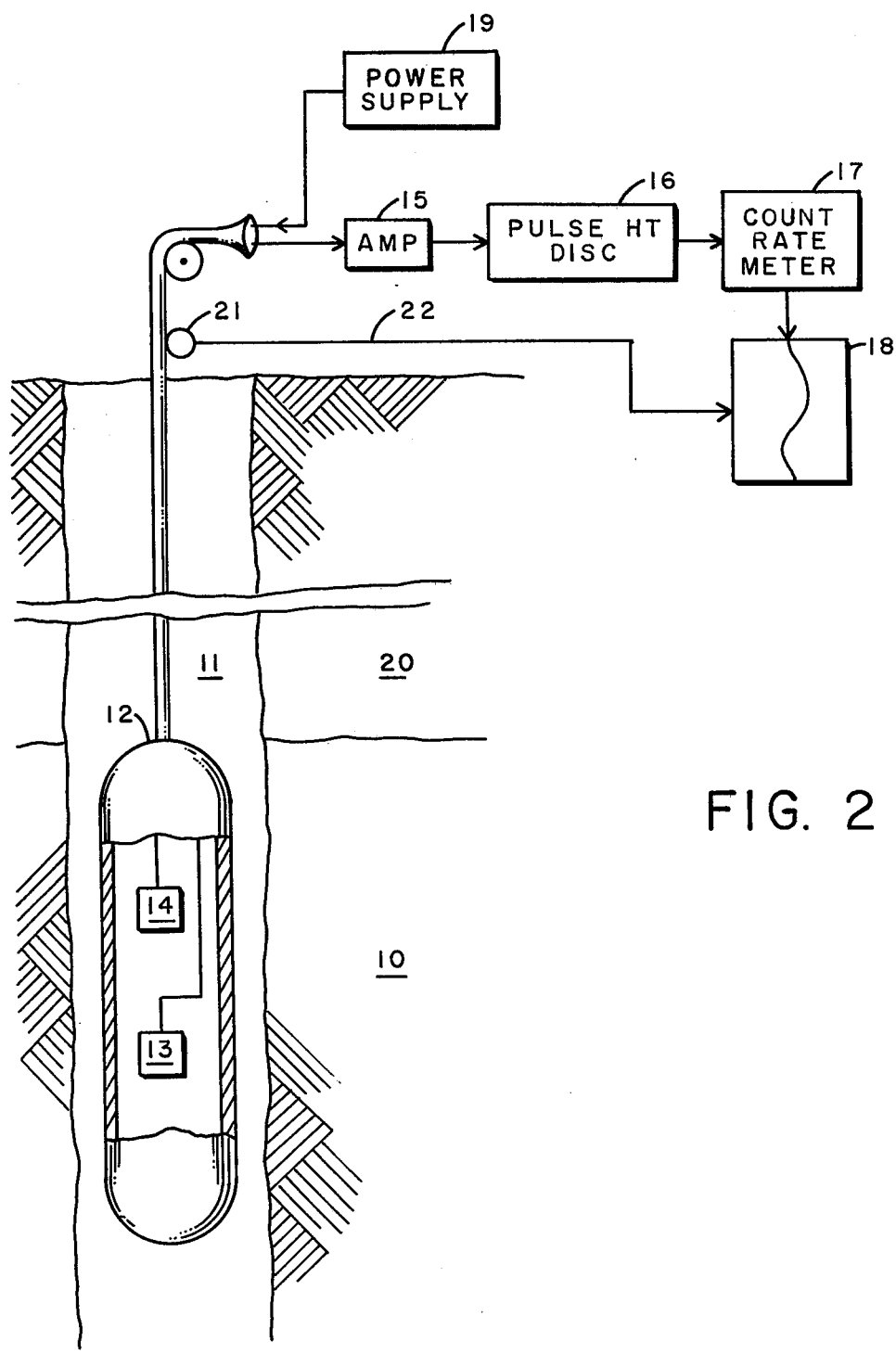
FIG. 2 illustrates a borehole tool and recording system for carrying out the present invention.

Referring now to FIG. 2 there is shown a preferred embodiment for carrying out the source-monitoring technique of the present invention in a radioactive borehole logging operation as might be carried out by the system shown in the aforementioned patent to Mills et al. The logging tool 12 is shown within the borehole 11 adjacent a formation 10 which is to be analyzed. The neutron source 13 is the accelerator-type producing 14-MEV neutrons. To monitor this source output so as to know that a constant output is produced during each measuring period or to correct or compensate for output variations, there is provided the fast neutron detector 14 and the surface monitoring recording system including the amplifier 15, pulse height discriminator 16, count rate meter 17, and recorder 18.

The source 13 may be operated continuously or may be pulsed. For pulsed operation, the source may emit bursts of 14-MEV neutrons at a relatively high repetition rate of a few hundred to a few thousand pulses per second. The burst width may be from a few microseconds up to several tens of microseconds with a source shut-off time after each burst of a few microseconds or less.

Figure 3:
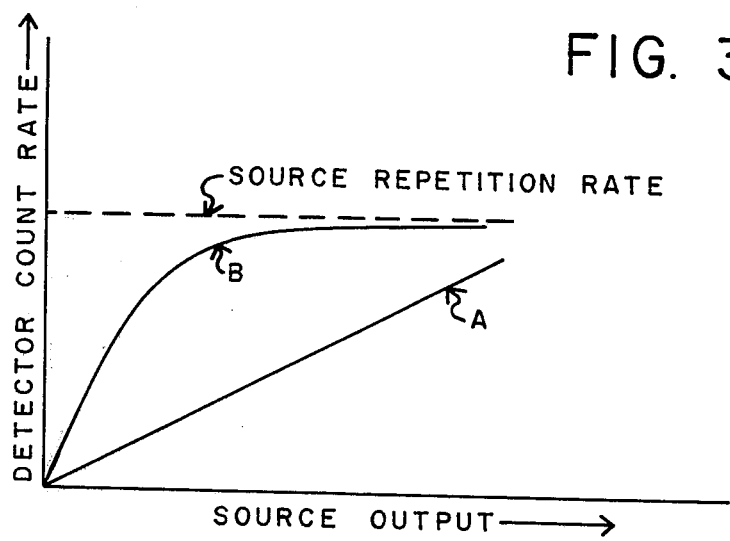
FIG. 3 illustrates a desired relationship between the outputs of the neutron source and detector of FIG. 2.

The fast neutron detector 14 may preferably be of the helium-3 type with high helium-3 gas pressure for good sensitivity to fast neutrons. The fast neutron detector 14 needs to be spaced from the neutron source such that it does not go into a state of saturation at the burst repetition rate of the neutron source. This occurs when the fast neutron detector counts a neutron from each neutron burst from the source. Consequently, in the preferred embodiment, the fast neutron detector 14 is located far enough from the neutron source 13 such that the probability of counting any source neutron entering the detector from a given burst is no greater than about 0.1. More specifically, it is desired that only one neutron count be detected for about every 10 bursts from the neutron source. This assures that the detector's output is a linear measure of source output. This will be made clearer by reference to FIG. 3 wherein the desired relationship between source output and the detector count rate is represented by the linear curve A. Should substantially more than about 1 neutron be counted for each 10 bursts of the neutron source, the detector will soon saturate at the burst repetition rate of the source and will no longer be an accurate measure of source output, as is represented by the saturation curve B.

The output of the fast neutron detector 14 is transmitted by way of the uphole amplifier 15 to the discriminator 16 which is biased to count helium-3 recoils from the 14-MEV source neutrons but none of the nonsource neutrons from the formation. As shown in FIG. 1, this biasing is selected to pass pulses from the amplifier 15 with MEV pulse heights in excess of those attributable to helium gas energy release in response to nonsource neutrons. As shown in FIG. 1, the bias is set above the trailing edge of the pulse height with a peak centered about 0.7 MEV. The count rate meter 17 counts such pulses and produces a signal representative of the fast neutron flux received by the detector 14. This signal identifies the output of the neutron source 13. Such signal may be recorded as a neutron source log on the recorder 18 in correlation with the depth of the tool 12 within the borehole 11 by means of the reel 21 and connection 22.

Measurements have shown that changes in the neutron output of the accelerator-type neutron source are linear, not sudden or sporadic. Changes in the order of 20 percent have been observed after one hour of source operation. Hence, it is desirable to either periodically or constantly monitor the neutron source output during measuring operations. The neutron source log obtained on the recorder 18 of the count of the fast neutron flux output of the source 13 may be used to correct the formation log (not shown) measured during the logging operations for changes in the output of the neutron source. A linear interpolation of the neutron source log will yield a continuous correction for the formation log.

In the alternative, it may be desirable to adjust the output of the neutron source. In operating an accelerator-type neutron source, it is important that the power supplied to the replenisher element be correctly adjusted so that the proper amount of deuterium gas boils off the replenisher element to provide a good neutron output. As the accelerator tube ages, a greater amount of power must be supplied to the replenisher element to boil off the same amount of deuterium gas. Accordingly, the power supplied to the replenisher element in the linear accelerator tube may be varied from the uphole power source 19 should it be desirable to maintain a uniform neutron output over each of a plurality of measuring operations.

I claim:

1. A system for directly monitoring the output of a fast neutron source in a borehole logging tool, comprising:
    (a) a neutron detector that interacts differently with fast neutrons directly from a neutron source and with epithermal or thermal neutrons returning to the borehole from irradiated formations surrounding the borehole, said detector producing a composite signal of pulses having a spectrum of differing pulse height characteristics attributable to said differing interactions, and
    (b) means for distinguishing between said differing pulse height characteristics to identify that portion of said composite signal attributable to the fast neutrons received by said detector directly from said source.

2. The system of claim 1 wherein said neutron detector includes helium-3 gas.

3. The sytem of claim 2 wherein said helium-3 gas is under pressure so as to provide sensitivity to fast neutrons.

4. The system of claim 3 wherein:
    (a) a first portion of said composite signal is attributable to the detection of epithermal and thermal neutrons from the formation in accordance with the $^3He(n,p)^3H$ reaction, and
    (b) a second portion of said composite signal is attributable to the detection of fast neutrons directly from said source in accordance with the $^3He(n,n)^3He$ reaction .

5. The system of claim 4 wherein:
    (a) said source produces fast neutrons of about 14 MEV,
    (b) said first portion of the spectrum of said composite signal exhibits pulse heights rising to a peak with center at about 0.7 MEV and decreasing substantially to zero thereafter, and
    (c) said second portion of the spectrum of said composite signal exhibits pulse heights ranging up to a maximum of about 11.5 MEV.

6. The system of claim 5 wherein said means for distinguishing between said differing pulse height characteristics of said composite signal includes a discriminator biased to pass those pulses representing that part of the second portion of the spectrum of said composite signal exceeding the trailing edge of the pulse height peak centered at about 0.7 MEV and attributable to epithermal and thermal neutrons from the formation.

7. The system of claim 6 further including means for counting the number of pulses passed by said discriminator.

8. The system of claim 7 further including a recording of the count of said pulses with time as a measure of the magnitude of source output.

9. The system of claim 3 wherein said helium-3 gas is surrounded by a thermal neutron shield.

10. The system of claim 9 wherein said thermal neutron shield includes cadmium.

11. The system of claim 1 wherein said source is a pulsed source and said detector is spaced from said source a sufficient distance to provide a probability of detecting a fast neutron from the source of no greater than 0.1 for each neutron burst.

* * * * *